US009036020B2

(12) United States Patent
Kono

(10) Patent No.: US 9,036,020 B2
(45) Date of Patent: May 19, 2015

(54) IMAGE ACQUISITION DEVICE

(75) Inventor: Takayuki Kono, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 361 days.

(21) Appl. No.: 13/472,947

(22) Filed: May 16, 2012

(65) Prior Publication Data
US 2012/0300053 A1  Nov. 29, 2012

(30) Foreign Application Priority Data

May 27, 2011 (JP) ................. 2011-119405

(51) Int. Cl.
| H04N 7/18 | (2006.01) |
| G02B 21/24 | (2006.01) |
| G02B 21/36 | (2006.01) |
| G02B 21/16 | (2006.01) |

(52) U.S. Cl.
CPC .............. G02B 21/24 (2013.01); G02B 21/16 (2013.01); G02B 21/36 (2013.01); G02B 21/362 (2013.01)

(58) Field of Classification Search
CPC ........ G02B 21/36; G02B 21/24; G02B 21/16; G02B 21/362; G02B 21/365; G02B 21/367; G02B 21/002; H04N 5/225; H04N 5/335; H04N 7/18; G03B 15/00; G01N 21/6458
USPC .......................................................... 348/79
See application file for complete search history.

(56) References Cited

U.S. PATENT DOCUMENTS

| 5,445,001 A | * | 8/1995 | Snavely ............................. 72/55 |
| 5,499,097 A | * | 3/1996 | Ortyn et al. .................. 356/615 |
| 7,272,252 B2 | * | 9/2007 | De La Torre-Bueno et al. ............................. 382/133 |
| 2001/0039032 A1 | * | 11/2001 | Matsumura et al. ............ 435/32 |
| 2003/0117523 A1 | * | 6/2003 | Hasegawa et al. ............. 348/374 |
| 2003/0151662 A1 | * | 8/2003 | Bopp ............................ 348/139 |
| 2003/0231791 A1 | * | 12/2003 | Torre-Bueno et al. ........ 382/133 |

(Continued)

FOREIGN PATENT DOCUMENTS

| JP | 8-149366 | 6/1996 |
| JP | Hei 09-186917 | 7/1997 |

(Continued)

OTHER PUBLICATIONS

JP2007208614MT, English Translations of the JP2007208614A can be downloaded from the JPO Web sites, 2007.*

(Continued)

Primary Examiner — Mehrdad Dastouri
Assistant Examiner — Shan Elahi
(74) Attorney, Agent, or Firm — Scully, Scott, Murphy & Presser, P.C.

(57) ABSTRACT

Provided is a camera including a housing; an intermediate plate that divides the interior of the housing into first and second chambers; image acquisition elements disposed in the first chamber within the housing; a motor disposed in the second chamber within the housing; a pivot shaft that extends through the intermediate plate and transmits a driving force from the motor; a bearing that is provided in a through-hole area for the pivot shaft extending through the intermediate plate and seals a gap formed around the pivot shaft; and a prism that is connected to the pivot shaft in the first chamber and is moved by the driving force transmitted by the pivot shaft so as to switchably guide light from a sample to at least one of the image acquisition elements.

9 Claims, 7 Drawing Sheets

(56) References Cited

U.S. PATENT DOCUMENTS

| | | | |
|---|---|---|---|
| 2004/0114219 A1* | 6/2004 | Richardson | 359/368 |
| 2004/0239243 A1* | 12/2004 | Roberts et al. | 313/512 |
| 2006/0072192 A1* | 4/2006 | Namii | 359/389 |
| 2006/0092505 A1* | 5/2006 | Abnet et al. | 359/380 |
| 2006/0184040 A1* | 8/2006 | Keller et al. | 600/476 |
| 2007/0225854 A1* | 9/2007 | Breton et al. | 700/121 |
| 2007/0247543 A1* | 10/2007 | Hozumi et al. | 348/360 |
| 2008/0055718 A1* | 3/2008 | Kono et al. | 359/381 |
| 2008/0111881 A1* | 5/2008 | Gibbs et al. | 348/36 |
| 2009/0002485 A1* | 1/2009 | Fujiwara | 348/80 |
| 2009/0304244 A1* | 12/2009 | Kolatt et al. | 382/128 |
| 2010/0073475 A1* | 3/2010 | Gibbs et al. | 348/135 |
| 2011/0117025 A1* | 5/2011 | Dacosta et al. | 424/9.6 |

FOREIGN PATENT DOCUMENTS

| | | | | |
|---|---|---|---|---|
| JP | 2004-191980 A | 7/2004 | | |
| JP | 2007-183418 A | 7/2007 | | |
| JP | 2007-208614 | 8/2007 | | |
| JP | 2007208614 A | * | 8/2007 | H04N 5/225 |

OTHER PUBLICATIONS

Japanese Office Action dated Feb. 3, 2015 received from related Japanese Patent Application No. 2011-119405.

* cited by examiner

IMAGE ACQUISITION DEVICE

BACKGROUND OF THE INVENTION

1. Field of the Invention

The present invention relates to image acquisition devices used in optical apparatuses, such as microscopes.

This application is based on Japanese Patent Application No. 2011-119405, the content of which is incorporated herein by reference.

2. Description of Related Art

In microscope observation, high-resolution images are required when performing pathological diagnosis based on the condition of cells or when acquiring images for detecting changes in a sample based on weak fluorescence. As means used for acquiring images, image acquisition devices employing image acquisition elements, such as CCDs, have been used in place of image acquisition devices employing conventional silver-salt films as image acquisition media (for example, see the United States Patent Application, Publication No. 2003/0117523 A1, Japanese Unexamined Patent Application, Publication No. 2007-208614, and Japanese Unexamined Patent Application, Publication No. Hei 9-186917).

An image acquisition device disclosed in the United States Patent Application, Publication No. 2003/0117523 A1 includes a solid-state image acquisition element for acquiring an image of an object, solid-state-image-acquisition-element cooling means for cooling the solid-state image acquisition element, and a printed board for electrical signal wiring. The printed board for electrical signal wiring serves as a portion of sealing means for sealing the solid-state image acquisition element and the solid-state-image-acquisition-element cooling means.

In an image acquisition device disclosed in Japanese Unexamined Patent Application, Publication No. 2007-208614, a partition wall divides the interior of the image acquisition device into a first chamber having an image acquisition element disposed therein and a second chamber having an opening. The first chamber and the second chamber are thermally connected to each other via a heat transfer member having thermal conductivity higher than that of a camera body.

An image acquisition device disclosed in Japanese Unexamined Patent Application, Publication No. Hei 9-186917 includes a plurality of image acquisition elements inside the image acquisition device, and optical-path splitting means for splitting an optical path extending from an objective lens to the image acquisition elements so as to guide light to the respective image acquisition elements. In this image acquisition device, lenses having different focal lengths are provided in the optical paths extending from the optical-path splitting means to the image acquisition elements so as to vary the magnification of images formed on light receiving surfaces of the image acquisition elements.

Color reproducibility is an important requirement in image acquisition elements used for pathological diagnosis. On the other hand, sensitivity is an important requirement when observing weak light, such as fluorescence or luminescence. Accordingly, the desired characteristics of image acquisition elements vary depending on the observation methods. By disposing image acquisition elements having different characteristics within an image acquisition device, a single image acquisition device can be used for various purposes.

When weak light is to be detected using an image acquisition device having two image acquisition elements disposed therein for such purposes, it is desired that observation light be made to enter only the image acquisition element that is to be used for image acquisition. Therefore, a driving mechanism is necessary for moving the optical-path splitting means that splits the optical path extending to the image acquisition elements. The driving mechanism uses mechanism components, such as gears or a guide mechanism. However, such a driving mechanism becomes abraded with use, thus producing dust particles, such as metal particles.

The image acquisition device is provided with a sealing section for preventing condensation, which is formed due to a change in outside temperature or due to cooling of the image acquisition elements, from adhering to the image acquisition elements or to glass cover members for the image acquisition elements, the aforementioned optical-path splitting means, and a connection section for connecting to a microscope. Since these components are disposed in the observation light path, the aforementioned dust particles would be reflected in the image of the object if they adhere to the components.

BRIEF SUMMARY OF THE INVENTION

The present invention provides an image acquisition device including a housing; a partition that divides an interior of the housing into first and second chambers; an image acquisition element disposed in the first chamber within the housing; a driving section disposed in the second chamber within the housing; a transmitting section that extends through the partition and transmits a driving force from the driving section; a sealing section that is provided in a through-hole area for the transmitting section extending through the partition so as to seal a gap formed around the transmitting section; and a light guiding section that is connected to the transmitting section in the first chamber and is configured to move into and out of an optical path of light from an object by the driving force transmitted by the transmitting section to guide light from the object to at least one of the image acquisition element and a component different from the image acquisition element.

DETAILED DESCRIPTION OF THE INVENTION

First Embodiment

An image acquisition device according to a first embodiment of the present invention will be described below with reference to FIGS. 1 to 4.

Figure 1:
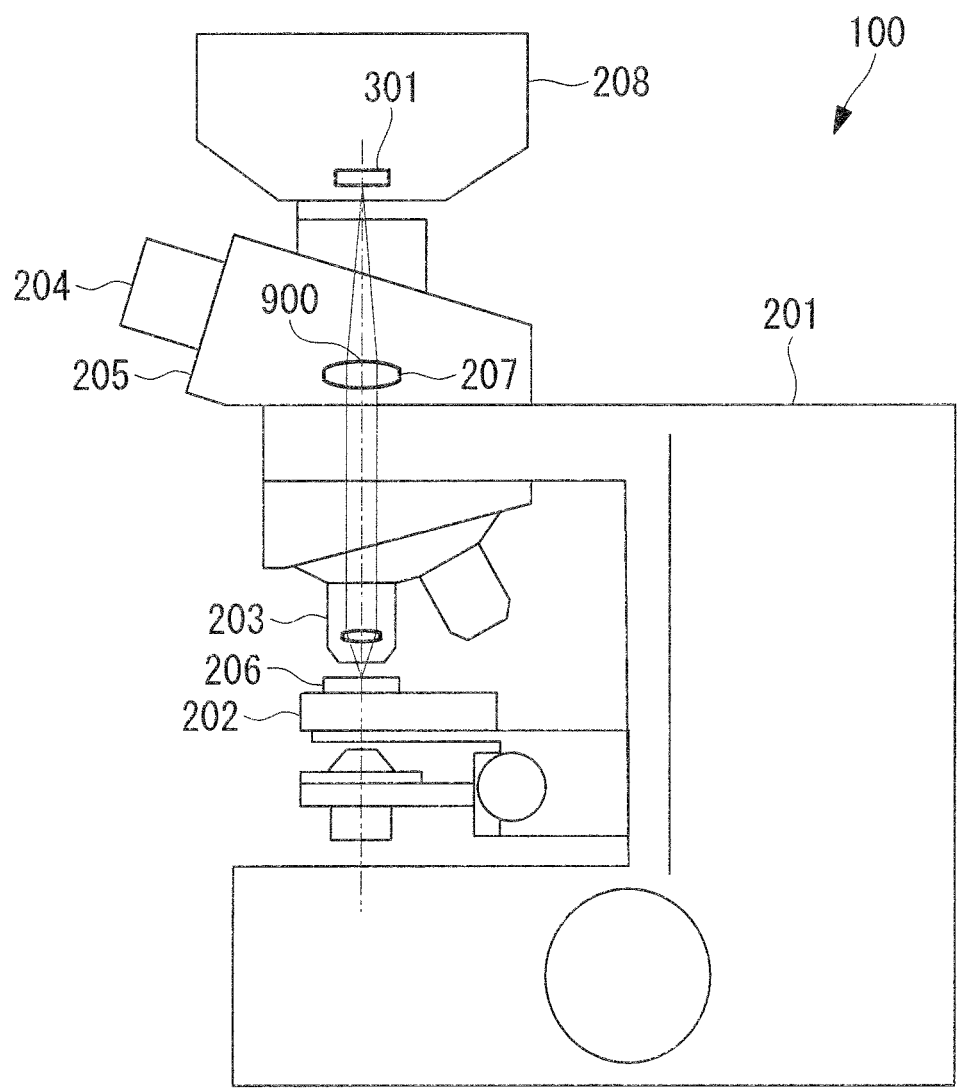
FIG. 1 schematically illustrates the configuration of a microscope equipped with a camera according to an embodiment of the present invention.

FIG. 1 schematically illustrates the configuration of a microscope 100 equipped with an image acquisition device 208 according to the first embodiment of the present invention.

The microscope 100 according to this embodiment includes a microscope body 201, a stage 202, an objective lens 203, an eyepiece 204, a lens barrel 205, an image forming lens 207, and a camera (image acquisition device) 208.

The objective lens 203 for magnifying a sample image is disposed facing the stage 202 and is provided in the microscope body 201. The stage 202 on which a sample (object) 206 is placed and which is vertically movable in the direction of an optical axis 900 of the objective lens 203 is provided on the microscope body 201. By vertically moving the stage 202, the sample 206 is positioned relative to the objective lens 203 in the direction of the optical axis 900 of the objective lens 203.

Moreover, the microscope body 201 is provided with the image forming lens 207 that forms an image of the sample 206 on an image acquisition element 301 within the camera 208, and is also provided with the lens barrel 205 fitted with the eyepiece 204 used for visual observation. The camera 208 is provided at a stage behind the image forming lens 207.

Figure 2:
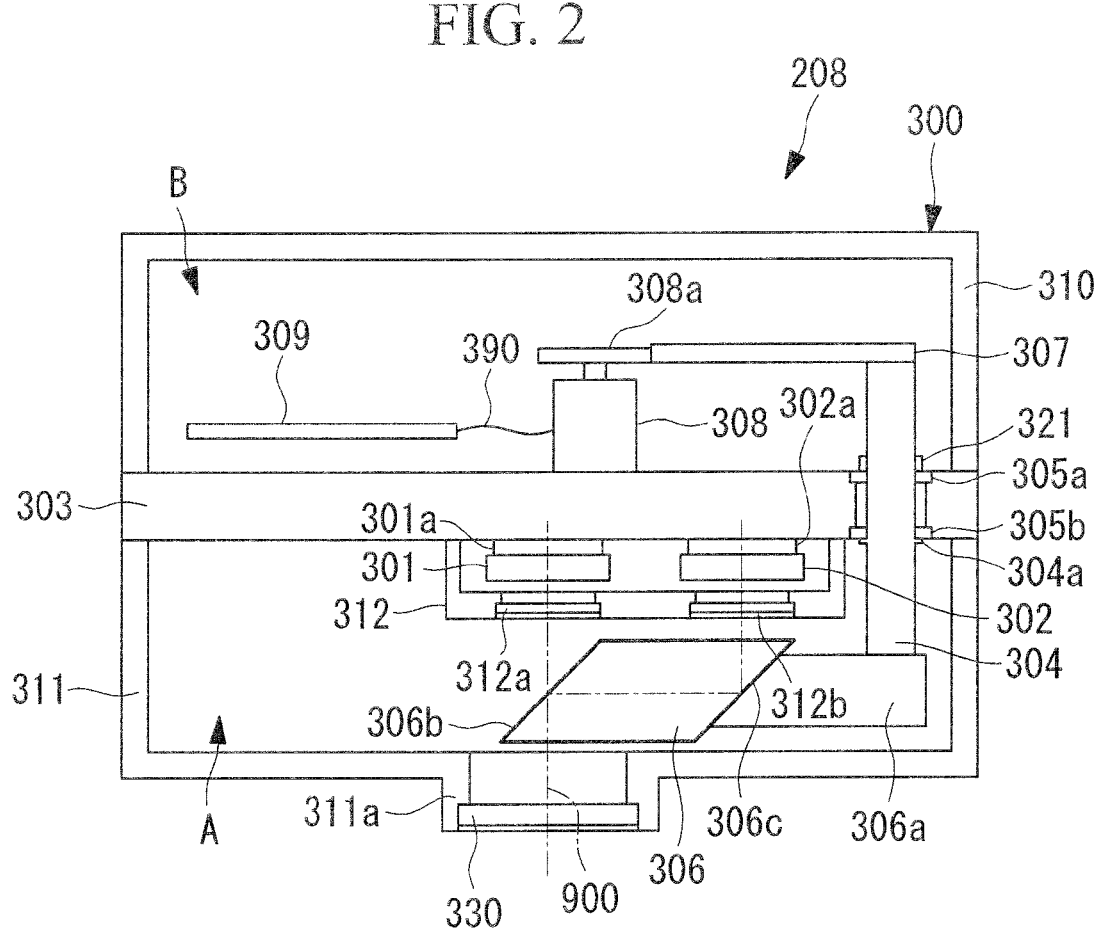
FIG. 2 is a vertical sectional view schematically showing the configuration of a camera according to a first embodiment of the present invention.

FIG. 2 is a vertical sectional view showing the internal configuration of the camera 208 in this embodiment.

As shown in FIG. 2, the camera 208 includes a housing 300 constituted of an upper cover 310 and a lower cover 311 each having the shape of a closed-end cylinder, that is, substantially cup-shaped, a disk-shaped intermediate plate (partition) 303 that divides the interior of the housing 300 into two chambers A and B, image acquisition elements 301 and 302 disposed in the chamber (first chamber) A within the housing 300, a motor (driving section) 308 disposed in the chamber (second chamber) B within the housing 300, a pivot shaft (transmitting section) 304 that extends through the intermediate plate 303 and transmits the driving force from the motor 308, bearings (sealing sections) 305a and 305b that are provided in a through-hole area for the pivot shaft 304 extending through the intermediate plate 303 so as to seal a gap formed around the pivot shaft 304, and a prism (light guiding section) 306 connected to the pivot shaft 304 in the chamber A.

Reference numeral 301 denotes a color image acquisition element with high color reproducibility, and reference numeral 302 denotes a monochromatic image acquisition element with high sensitivity. The image acquisition elements are respectively connected to heat exchanging elements 301a and 302a. The heat exchanging elements 301a and 302a are fixed to the intermediate plate 303 constituting an outer wall of the camera 208 without any gaps.

The intermediate plate 303 is provided with upper and lower openings, as shown in FIG. 2, and the bearings 305a and 305b for rotating the pivot shaft 304 are respectively fitted into these openings. The bearings 305a and 305b are installed from the upper and lower sides of the intermediate plate 303, respectively. The pivot shaft 304 is inserted into the bearing 305b from the lower side until a protrusion 304a is brought into abutment therewith. Subsequently, a ring 321 is screwed onto a threaded portion provided around the pivot shaft 304 from above, whereby the pivot shaft 304 is secured to the intermediate plate 303 in a rotatable manner. The gap between the intermediate plate 303 and the pivot shaft 304 is sealed by the bearings 305a and 305b.

A supporter 306a for the prism 306 is fixed to one end (i.e., the lower end in FIG. 2) of the pivot shaft 304 by using a screw (not shown). The prism 306 and the supporter (connection member) 306a are securely bonded to each other.

Figure 4:
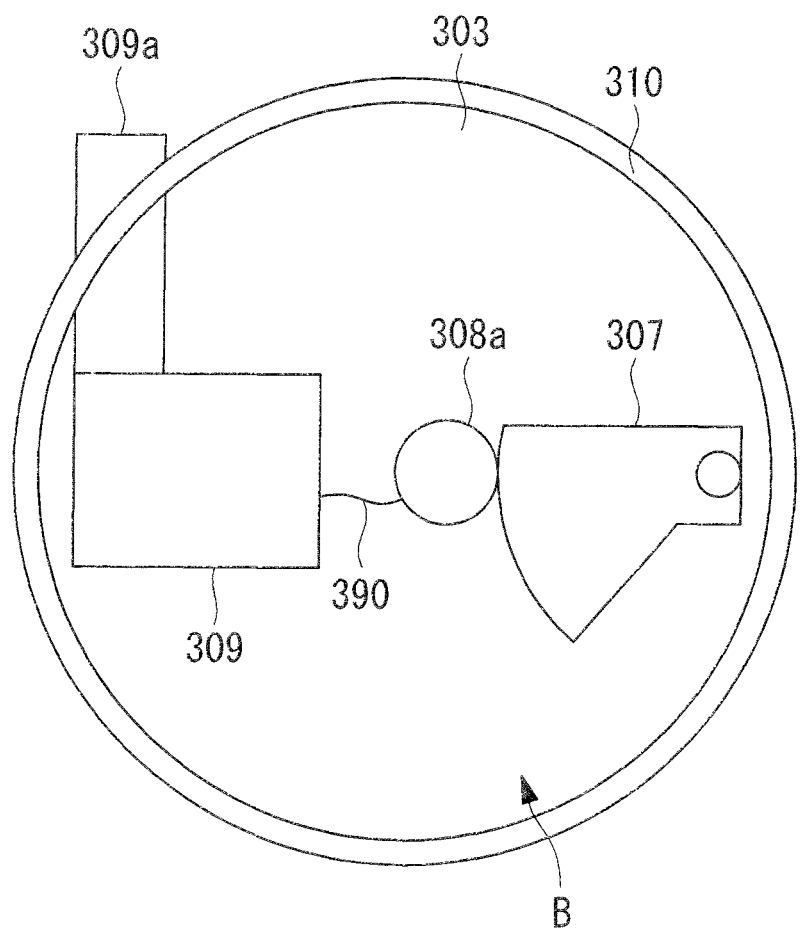
FIG. 4 is a plan view of a chamber B in FIG. 2, as viewed from the upper side thereof.

As shown in FIGS. 2 and 4, an arch-shaped gear (rack) 307 is fixed to the other end (i.e., the upper end in FIG. 2) of the pivot shaft 304 by using a screw (not shown). The gear 307 is meshed with a gear (pinion) 308a that is fixed to the motor 308, so that the rotational force of the motor 308 can be transmitted to the pivot shaft 304. The motor 308 is connected to a board 309 via a cable 390. The motor 308 may be, for example, a stepping motor in which the amount of rotation can be arbitrarily pulse-controlled.

The intermediate plate 303 is fixed to the upper cover 310 and the lower cover 311 by using screws (not shown). The lower cover 311 is provided with an opening 311a for connecting with a microscope. The opening 311a has a partially stepped shape, and a glass dust cover 330 is securely bonded thereto.

The image acquisition elements 301 and 302 are accommodated within a closed container 312 disposed in the chamber A. Two openings are provided at the lower side of the closed container 312, and glass dust covers 312a and 312b are securely bonded to these openings without any gaps. An elastic member (not shown) is disposed between the closed container 312 and the intermediate plate 303 so that moisture does not readily enter the closed container 312. A dehumidifying member (not shown), such as silica gel, is provided within the closed container 312.

FIG. 4 is a plan view of the chamber B in FIG. 2, as viewed from the upper side thereof. The intermediate plate 303 has an outline that is the same as or larger than that of the upper cover 310. A PC connector 309a is attached to the board 309. The upper cover 310 is provided with an opening (not shown) that conforms to the outline of the connector 309a in the vertical direction in FIG. 4 without any gaps. The connector 309a is connected to a control mechanism (not shown), such as a personal computer, connected to the camera. With this configuration, the chamber B in which the motor 308 and the like are disposed is made into a closed chamber. The outlines of the upper cover 310 and the lower cover 311 are the same, and the chamber A in which the prism 306 and the like are disposed is also a closed chamber.

Figure 3:
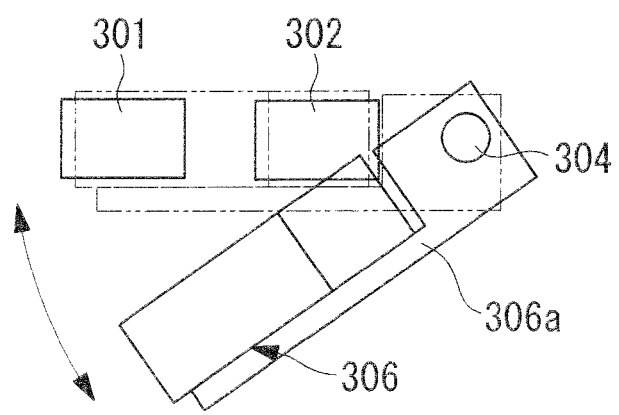
FIG. 3 is a plan view of a chamber A in FIG. 2, as viewed from the lower side thereof.

FIG. 3 is a plan view of the chamber A in FIG. 2, as viewed from the lower side thereof, and illustrates the positional relationships among the image acquisition elements 301 and 302, the prism 306, and the pivot shaft 304. The arrow in the drawing denotes a direction in which the pivot shaft 304 moves in response to the rotation of the motor 308. The two-dot chain line in the drawing denotes the position of the prism 306 when observing with the image acquisition element 302, and the solid line denotes the position of the prism 306 when observing with the image acquisition element 301.

The image acquisition elements 301 and 302 are arranged along the surface of the intermediate plate 303.

The image acquisition element 301 is disposed on the optical axis 900 of the objective lens 203.

The prism 306 includes a reflective surface 306b that reflects light (observation light) from the sample 206 to a direction perpendicular to the optical axis 900, and a reflective surface 306c that reflects the light reflected by the reflective surface 306b to a direction parallel to the optical axis 900.

As shown in FIG. 3, the prism 306 is movable to and away from the optical axis 900 of the objective lens 203 by the driving force from the motor 308 transmitted by the pivot shaft 304. Specifically, when the motor 308 is activated, the prism 306 is pivoted about the through-hole area (the bearings 305a and 305b) in the intermediate plate 303, whereby the prism 306 is moved to or away from the optical axis 900 of the objective lens 203.

Accordingly, when the motor 308 is activated, the driving force of the motor 308 is transmitted to the pivot shaft 304 so that the prism 306 is pivoted about the through-hole area in the intermediate plate 303, thereby switchably guiding the observation light to the image acquisition element 301 or 302. Specifically, when the prism 306 is moved away from the optical axis 900, the observation light can be guided to the image acquisition element 301 disposed on the optical axis 900. On the other hand, when the prism 306 is moved to the optical axis 900, the observation light can be guided to the image acquisition element 302.

The operation of the microscope 100 having the above-described configuration will be described below.

When a sample image is to be acquired, the sample 206 is placed on the stage 202, and the stage 202 is moved in the vertical direction so as to align the sample 206 with the focal position of the objective lens 203. Thus, a magnified image of the sample 206 becomes observable via the image forming lens 207 and the eyepiece 204. When observing with the camera 208, the observation light is made to enter the camera 208 by using an optical-path switching mechanism (not shown) provided in the lens barrel 205.

When observing with the image acquisition element 301, the control mechanism (not shown), such as a PC, connected to the camera 208 is operated so as to rotate the motor 308 via the connector 309a and the board 309. Then, the rotational force of the motor 308 is transmitted to the supporter 306a via the gear 308a, the gear 307, and the pivot shaft 304 so that the supporter 306a is rotated, thereby moving the prism 306 away from the optical axis 900. Consequently, the prism 306 is set in the position denoted by the solid line in FIG. 3 so that the observation light is made to enter the image acquisition element 301.

When observing with the image acquisition element 302, the control mechanism is operated as described above so as to rotate the motor 308 in a direction opposite to that in the above-described case. Then, the rotational force of the motor 308 is transmitted to the supporter 306a, as in the above-described case, whereby the prism 306 is set on the optical axis 900. Fine positional adjustment of the prism 306 is performed by pulse-control if the motor 308 is a stepping motor.

Consequently, the prism 306 is set in the position denoted by the two-dot chain line in FIG. 3. In this case, the observation light entering the camera 208 is first reflected rightward in FIG. 2 by the prism 306 and is subsequently reflected upward so as to enter the image acquisition element 302.

The image acquisition elements 301 and 302 are cooled by driving the heat exchanging elements 301a and 302a, and heat generated in the heat exchanging elements is transmitted to the intermediate plate 303, the upper cover 310, and the lower cover 311, which are then cooled by outside air.

Since the upper side (i.e., the chamber B) and the lower side (i.e., the chamber A) of the intermediate plate 303 are completely sealed off from each other by the pivot shaft 304 and the bearings 305a and 305b, dust particles, such as metal particles, produced at the gears 307 and 308a are prevented from falling into the chamber at the lower side of the intermediate plate 303, thereby preventing the dust particles from blocking the observation light. Moreover, since the bearings used are generally of a sealed type, dust particles produced as a result of the rotation of the pivot shaft 304 are also prevented from blocking the observation light.

As described above, in the camera 208 according to this embodiment, the intermediate plate 303 divides the interior of the housing 300 into two chambers A and B, the image acquisition elements 301 and 302 are disposed in the chamber A, and the motor 308 is disposed in the chamber B. Moreover, when the motor 308 is activated, the driving force of the motor 308 is transmitted to the prism 306 disposed in the chamber A via the pivot shaft 304 extending through the intermediate plate 303. Thus, the prism 306 is moved by the driving force transmitted via the pivot shaft 304, thereby switchably guiding the observation light to the image acquisition element 301 or 302.

In this case, the through-hole area for the pivot shaft 304 extending through the intermediate plate 303 is provided with the bearings 305a and 305b that seal the gap between the wall surface of the through-hole area and the pivot shaft 304. Consequently, dust particles, such as metal particles, from the motor 308 disposed in the chamber B can be prevented from entering the chamber A in which the image acquisition elements 301 and 302 are disposed, whereby a high-quality observation image with no reflections of dust or the like can be acquired.

Furthermore, since the transmission mechanism for transmitting the driving force of the motor 308 to the prism 306 is constituted of a small number of mechanical components, such as a shaft and gears, and does not use electrical components, such as wireless components, which are expensive, cost reduction and high reliability are achieved. In addition, because the motor 308 and the image acquisition elements 301 and 302 are separated from each other, the motor 308, which has a relatively high failure rate, can be accessed readily, thereby achieving improved maintainability.

Furthermore, with the image acquisition elements 301 and 302 having different characteristics, an image of the sample 206 can be acquired by selecting an appropriate image acquisition element depending on the intended usage. Specifically, in this embodiment, a color image acquisition element with high color reproducibility is used as the image acquisition element 301, and a monochromatic image acquisition element with high sensitivity is used as the image acquisition element 302. With this configuration, the image acquisition element 302 can be used for acquiring an image of the sample 206 by detecting weak fluorescence, and the image acquisition element 301 can be used for acquiring an image of the sample 206 with high color reproducibility, which is suitable for pathological diagnosis.

Furthermore, since the image acquisition elements 301 and 302 are accommodated in the closed container 312, dust particles from the motor 308 can be reliably prevented from adhering to the image acquisition elements 301 and 302, whereby a higher quality observation image can be acquired.

In this embodiment, when the prism 306 is set on the optical axis 900, the observation light is entirely guided to the image acquisition element 302. Alternatively, for example, the observation light may be split by the prism 306 so as to be guided to both the image acquisition element 301 and the image acquisition element 302.

Furthermore, although the upper cover 310 and the lower cover 311 are cup-shaped, and the intermediate plate 303 is disk-shaped in this embodiment, the shapes thereof are not limited so long as the chamber A and the chamber B can be sealed.

Second Embodiment

Next, a camera 408 according to a second embodiment of the present invention will be described below with reference to FIGS. 5 to 8. With regard to the camera 408 according to this embodiment, components that are the same as those in the camera 208 according to the first embodiment are given the same reference numerals, and descriptions thereof will be omitted. The following description mainly relates to the differences from the first embodiment.

Figure 5:
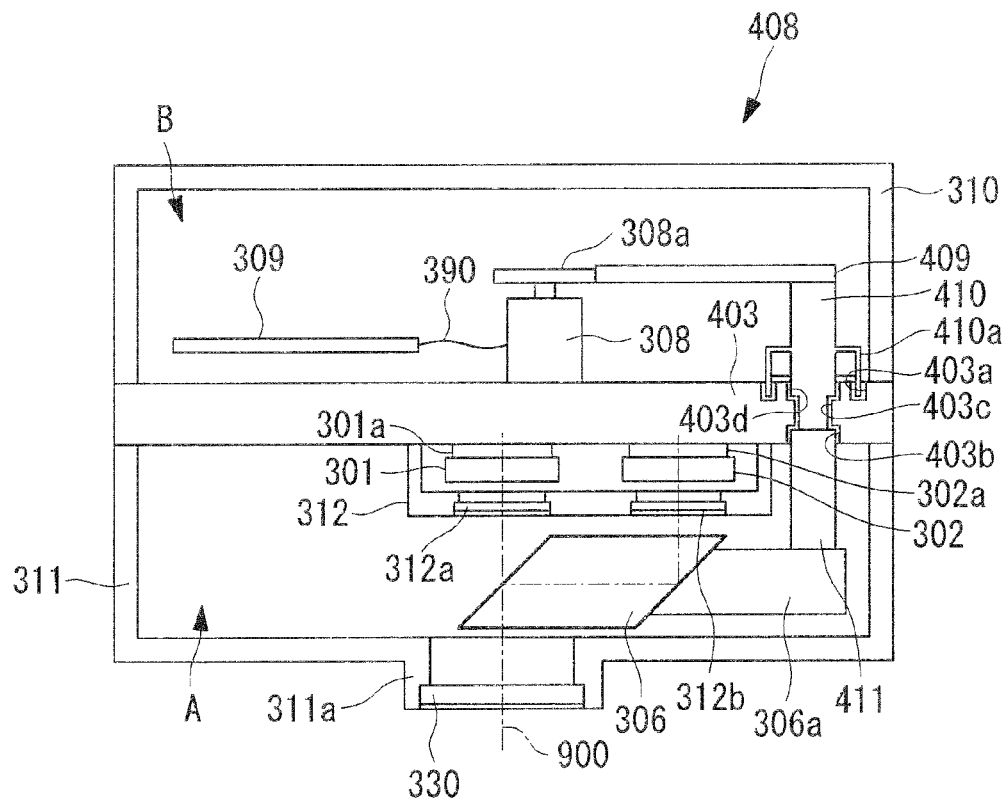
FIG. 5 is a vertical sectional view schematically showing the configuration of a camera according to a second embodiment of the present invention.
Figure 6:
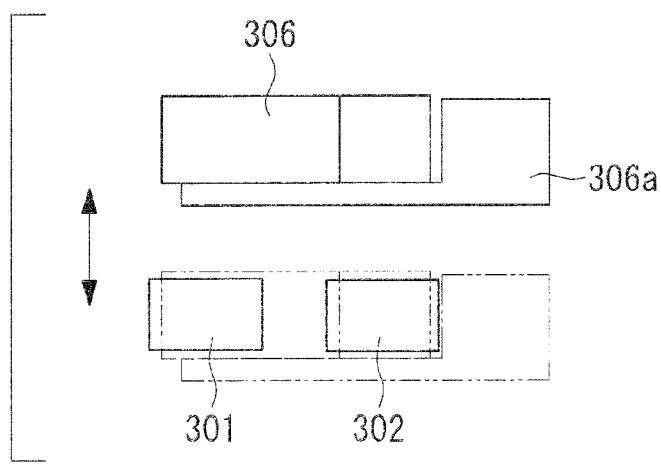
FIG. 6 is a plan view of a chamber A in FIG. 5, as viewed from the lower side thereof.
Figure 7:
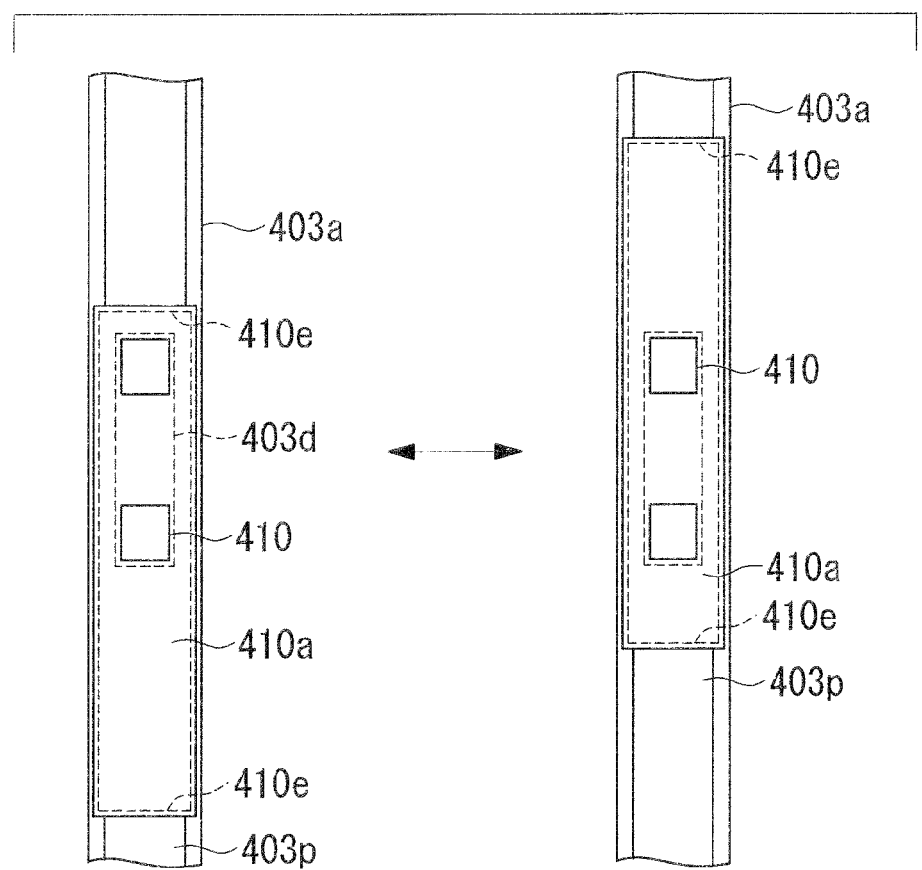
FIG. 7 is a plan view of a through-hole area in an intermediate plate in FIG. 5, as viewed from the upper side thereof.
Figure 8:
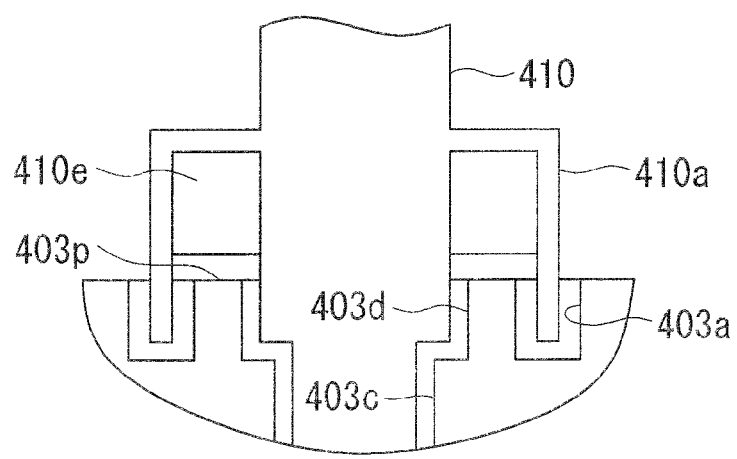
FIG. 8 is a vertical sectional view of the through-hole area in the intermediate plate in FIG. 5.

FIG. 5 is a vertical sectional view of the camera 408 according to this embodiment. FIG. 6 is a plan view of the chamber A, showing the positional relationship between the prism 306 and the image acquisition elements 301 and 302. FIG. 7 is a top view showing the configuration of an area surrounding openings in an intermediate plate 403. FIG. 8 is a partially enlarged vertical sectional view of the area surrounding the openings in the intermediate plate 403.

Reference numerals 410 and 411 denote guide rods that are connected to a guide mechanism (not shown), such as a linear guide, disposed in the chamber at the upper side of the intermediate plate 403. The guide rods 410 and 411 are fixed to each other with a screw (not shown).

An area of the guide rod 410 near the intermediate plate 403 is provided with a protrusion 410a. The protrusion 410a is disposed in grooves 403a provided in the intermediate plate 403 with a gap of about 0.5 mm therebetween. The intermediate plate 403 is provided with openings 403b, 403c, and 403d having a crank shape in cross section. A slight gap is provided between the openings 403b, 403c, and 403d and a narrow portion of the guide rod 410 and the guide rod 411.

As shown in FIG. 7, the protrusion 410a covers the opening 403d provided in the intermediate plate 403 regardless of the driving range of the guide rod 410. As is apparent from FIG. 7, the protrusion 410a has a shape that covers the entire periphery of the guide rod 410 in the lateral direction thereof. The guide rod 410 is also provided with a protrusion 410e. The protrusion 410e is spaced apart from an upper surface 403p of the intermediate plate 403 by a gap.

The guide rod 410 is fixed to a rack 409, which is meshed with the gear 308a fixed to a rotation shaft of the motor 308, by using a screw (not shown), and receives the rotational force from the motor 308. Specifically, when the motor 308 is rotationally driven, the rack 409 (and the guide rod 410 fixed to the rack 409) can be moved in a direction perpendicular to the plane of FIG. 5.

The guide rod 411 is fixed to the supporter 306a with a screw (not shown).

The operation of the camera 408 having the above-described configuration will be described below. A description of the operation similar to that of the camera 208 according to the above embodiment will be omitted.

When observing with the image acquisition element 301, the control mechanism is operated so that the rotational force of the motor 308 is transmitted to the rack 409, thereby moving the supporter 306a in the direction perpendicular to the plane of FIG. 5. Then, the sample 206 is observed in a state where the prism 306 is moved away from the optical axis 900.

When observing with the image acquisition element 302, the control mechanism is operated, as described above, so as to set the prism 306 on the optical axis 900.

Dust particles, such as metal particles, produced due to friction between the gear 308a and the rack 409 are prevented from falling to the lower side (i.e., the chamber A) of the intermediate plate 403 by a labyrinth structure constituted of the protrusion 410a, the grooves 403a, the guide rod 411, and the opening 403b. Moreover, since the prism 306 is moved parallel to the reflective surfaces, unlike the pivot mechanism, the observation light is prevented from being decentered even if the prism 306 is roughly set in position.

Accordingly, in addition to achieving advantages similar to those of the camera 208 according to the above embodiment, the camera 408 according to this embodiment can be formed at lower cost since the prism 306 can be roughly set in position.

Third Embodiment

Next, a camera 508 according to a third embodiment of the present invention will be described below with reference to FIG. 9. With regard to the camera 508 according to this embodiment, components that are the same as those in the camera 208 according to the first embodiment are given the same reference numerals, and descriptions thereof will be omitted. The following description mainly relates to the differences from the first embodiment.

Figure 9:
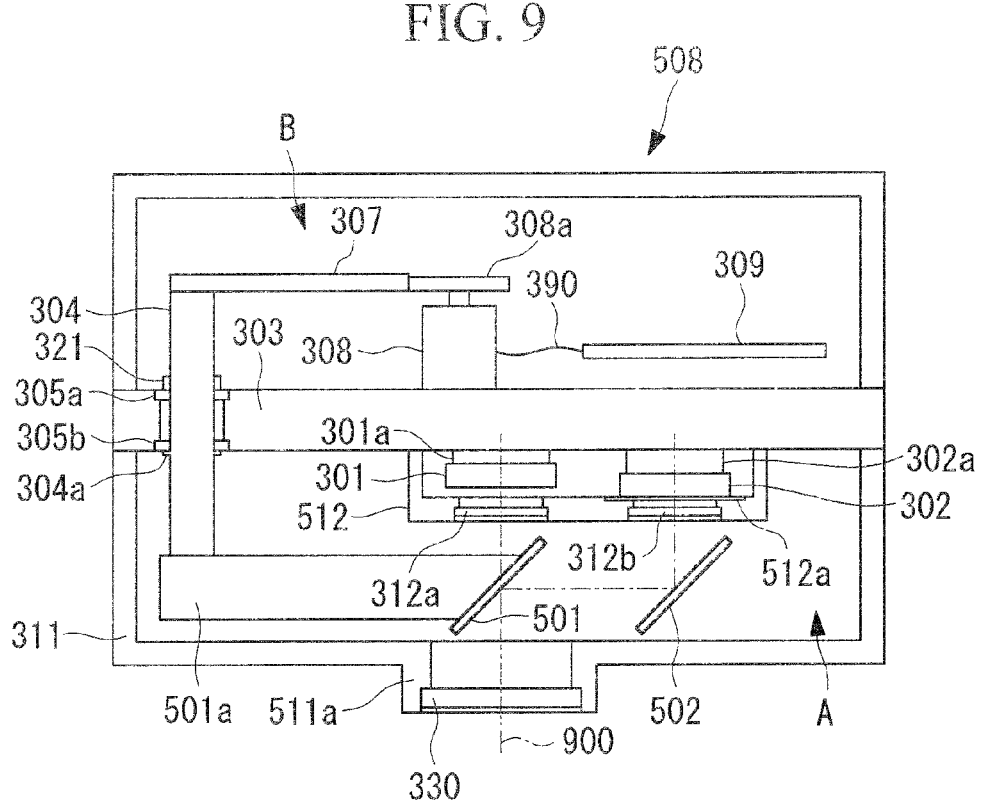
FIG. 9 is a vertical sectional view schematically showing the configuration of a camera according to a third embodiment of the present invention.

FIG. 9 is a vertical sectional view of the camera 508 according to this embodiment.

In this embodiment, mirrors (light guiding sections) 501 and 502 are provided in place of the prism 306. The mirror 501 is securely bonded to a supporter 501a. The supporter 501a is fixed to one end of the pivot shaft 304 by using a screw (not shown). The mirror 502 is securely bonded to a supporter (not shown) for the lower cover 311.

Since the prism is replaced by the mirrors in this embodiment, the actual distance between an opening 511a and the image acquisition element 302 is smaller than that in the first embodiment (the air-equivalent distance is the same). Therefore, the image acquisition element 302 is disposed lower than that in the state shown in FIG. 2. Furthermore, an opening 512a is provided for preventing interference between the image acquisition element 302 and a closed container 512.

The operation of the camera 508 having the above-described configuration will be described below. A description of the operation similar to that of the camera 208 according to the above embodiment will be omitted.

When observing with the image acquisition element 301, the motor 308 is rotated so as to move the mirror 501 away from the optical axis 900. Thus, observation light entering through the opening 511a enters the image acquisition element 301.

When observing with the image acquisition element 302, the motor 308 is rotated so as to set the mirror 501 on the optical axis 900. Consequently, the observation light entering through the opening 511a is deflected by the mirrors 501 and 502 so as to enter the image acquisition element 302.

Accordingly, in addition to achieving advantages similar to those of the camera 208 according to the above embodiment, the camera 508 according to this embodiment can reduce an offset load caused by the gravitational force applied to the pivot shaft 304 since the mirrors used are lighter than a prism, thereby allowing for more accurate positioning.

Fourth Embodiment

Next, a camera 608 according to a fourth embodiment of the present invention will be described below with reference to FIG. 10. With regard to the camera 608 according to this embodiment, components that are the same as those in the camera 508 according to the third embodiment are given the same reference numerals, and descriptions thereof will be omitted. The following description mainly relates to the differences from the third embodiment.

Figure 10:
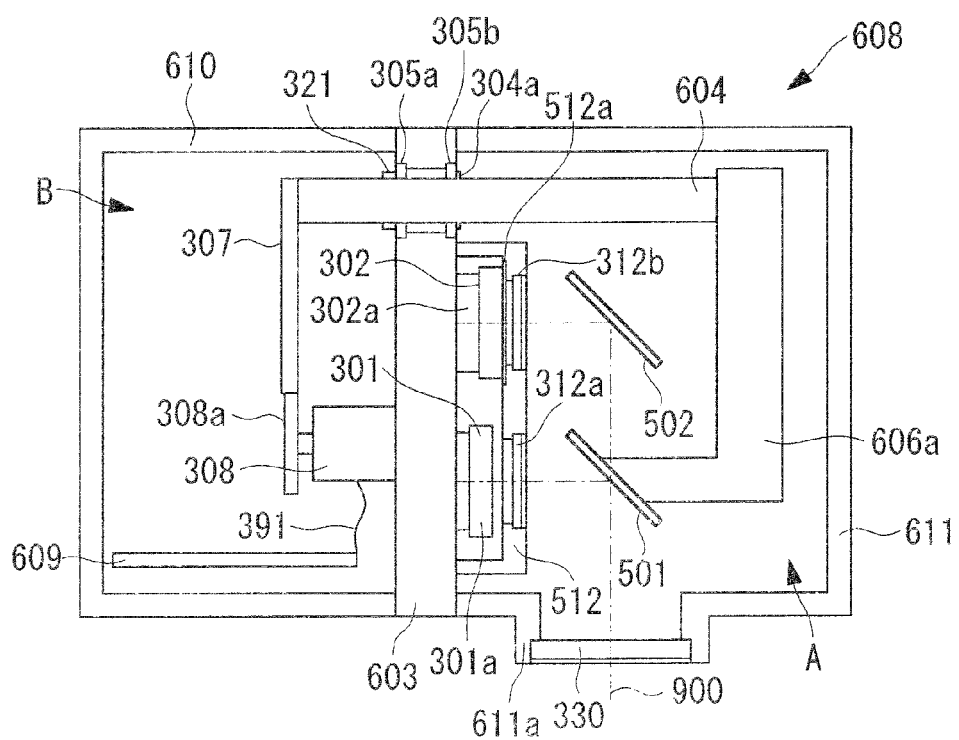
FIG. 10 is a vertical sectional view schematically showing the configuration of a camera according to a fourth embodiment of the present invention.

FIG. 10 is a vertical sectional view of the camera 608 according to this embodiment.

An intermediate plate 603 is provided with left and right openings, as shown in FIG. 10, and the bearings 305a and 305b for rotating a pivot shaft 604 are respectively fitted into these openings.

The bearings 305a and 305b are installed from the left and right sides of the intermediate plate 603, respectively. The pivot shaft 604 is inserted into the bearing 305b from the right side until the protrusion 304a is brought into abutment therewith. Subsequently, the ring 321 is screwed onto the threaded portion provided around the pivot shaft 604 from the left side, whereby the pivot shaft 604 is secured to the intermediate plate 603 in a rotatable manner.

A supporter 606a for the mirror 501 is fixed to one end of the pivot shaft 604 by using a screw (not shown). The mirror 501 and the supporter 606a are securely bonded to each other.

The motor 308 is connected to a driver board 609 via a cable 391.

The intermediate plate 603 is fixed to an upper cover 610 and a lower cover 611 by using screws (not shown). The lower cover 611 is provided with an opening 611a for connecting with a microscope. The opening 611a has a partially stepped shape, and the glass dust cover 330 is securely bonded thereto.

The operation of the camera 608 having the above-described configuration will be described below. A description of the operation similar to that of the camera 508 according to the third embodiment will be omitted.

When observing with the image acquisition element 302, the motor 308 is rotated so as to move the mirror 501 away from the optical axis 900. Thus, observation light entering through the opening 611a is deflected by the mirror 502 so as to enter the image acquisition element 302.

When observing with the image acquisition element 301, the motor 308 is rotated so as to set the mirror 501 on the optical axis 900. Consequently, the observation light entering through the opening 611a is deflected by the mirror 501 so as to enter the image acquisition element 301.

Accordingly, similar to the camera 508 according to the third embodiment, the camera 608 according to this embodiment can reduce an offset load caused by the gravitational force applied to the pivot shaft 604 since the mirrors used are lighter than a prism, thereby allowing for more accurate positioning.

Fifth Embodiment

Next, a camera 808 according to a fifth embodiment of the present invention will be described below with reference to FIG. 11. With regard to the camera 808 according to this embodiment, components that are the same as those in the camera 208 according to the first embodiment are given the same reference numerals, and descriptions thereof will be omitted. The following description mainly relates to the differences from the first embodiment.

Figure 11:
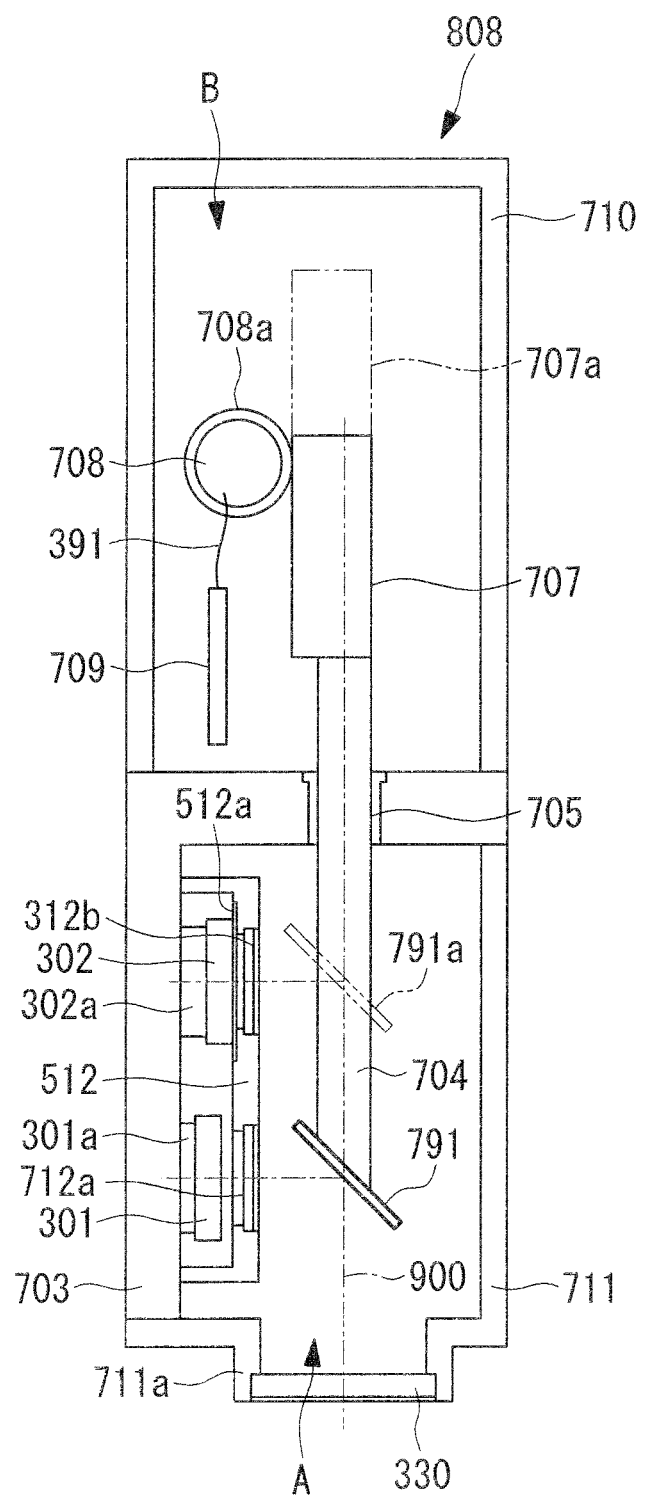
FIG. 11 is a vertical sectional view schematically showing the configuration of a camera according to a fifth embodiment of the present invention.

FIG. 11 illustrates the camera 808 according to this embodiment.

An intermediate plate 703 is provided with an opening extending in the vertical direction in FIG. 11. A bearing 705, such as a linear bushing, for vertically moving a shaft 704 is fitted and fixed in the opening.

A mirror 791 is securely bonded to one end (i.e., the lower end in FIG. 11) of the shaft 704.

A rack 707 is fixed to the other end (i.e., the upper end in FIG. 11) of the shaft 704 by using a screw (not shown). The rack 707 is meshed with a gear 708a that is fixed to a motor 708, so that the rotational force of the motor 708 can be transmitted to the shaft 704. The motor 708 is connected to a board 709 via the cable 391. The motor 708 may be, for example, a stepping motor in which the amount of rotation can be arbitrarily pulse-controlled.

The intermediate plate 703 is fixed to an upper cover 710 and a lower cover 711 by using screws (not shown). The lower cover 711 is provided with an opening 711a for connecting with a microscope. The opening 711a has a partially stepped shape, and the glass dust cover 330 is securely bonded thereto.

The operation of the camera 808 having the above-described configuration will be described below. A description of the operation similar to that of the camera 208 according to the first embodiment will be omitted.

When observing with the image acquisition element 302, a control mechanism (not shown), such as a PC, connected to the camera 808 is operated so as to rotate the motor 708. Then, the rotational force of the motor 708 is transmitted to the mirror 791 via the gear 708a, the rack 707, and the shaft 704, thereby moving the mirror 791 upward in FIG. 11. In this case, the rack 707 is set at a position 707a denoted by a two-dot chain line in FIG. 11, and the mirror 791 is set at a position 791a denoted by a two-dot chain line in FIG. 11. The observation light 900 is deflected by the mirror 791 at this position 791a so as to enter the image acquisition element 302.

When observing with the image acquisition element 301, the control mechanism is operated, as described above, so as to rotate the motor 708 in a direction opposite to that in the above-described case. Then, the rotational force of the motor 708 is transmitted to the shaft 704, as in the above-described case, whereby the mirror 791 is set at a position denoted by a solid line in FIG. 11. The observation light 900 is deflected by the mirror 791 so as to enter the image acquisition element 301. Fine positional adjustment of the mirror 791 is performed by pulse-control if the motor 708 is a stepping motor.

Since the upper side (i.e., the chamber B) and the lower side (i.e., the chamber A) of the intermediate plate 703 are completely sealed off from each other by the shaft 704 and the bearing 705, dust particles, such as metal particles, produced due to friction between the rack 707 and the gear 708a are prevented from falling into the chamber A at the lower side of the intermediate plate 703, thereby preventing the dust particles from blocking the observation light. Moreover, since the bearing 705 used is generally of a sealed type, dust particles produced as a result of the vertical movement of the shaft 704 are also prevented from blocking the observation light.

Accordingly, in addition to achieving advantages similar to those of the camera 208 according to the above embodiment, the camera 808 according to this embodiment can achieve a smaller footprint (installation area) since the components are set in the vertical direction.

Although the embodiments of the present invention have been described above in detail with reference to the drawings, specific configurations are not limited to these embodiments, and design modifications are to be included so long as they do not depart from the scope of the invention. For example, the present invention may be applied to an embodiment constituted of an appropriate combination of the above embodiments.

Furthermore, although a camera equipped with two image acquisition elements is described as an example in each of the embodiments, the camera may be equipped with three or more image acquisition elements.

Furthermore, although each of the above embodiments provides a configuration for switchably guiding light from an object to at least one of the image acquisition element 301 and the image acquisition element 302, which is a component different from the image acquisition element 301, by using the light guiding section or sections, the present invention is not limited to this configuration. For example, the same advantages can be achieved by using a configuration for switchably guiding the aforementioned light to at least one of the image acquisition element 301 and a photoelectric element (photo-diode), or a configuration for switchably guiding the light from an object to at least one of the image acquisition element 301 and an optical system disposed in a visual observation optical path.

Furthermore, for example, a link mechanism may be used in place of the gears in the first embodiment, or a solenoid may be used in place of the motor in the second embodiment. Moreover, the image acquisition element 301 used for detecting observation light that does not travel through the prism may be of a high-sensitivity type.

Furthermore, the closed container 312 may be provided for each image acquisition element. In order to reduce moment generated about the axis of the pivot shaft 304 due to the weight of the prism or the mirrors, the pivot shaft 304 may be provided with a balancer, such as a weight.

Furthermore, although the upper cover 310, the lower cover 311, and the intermediate plate 303 have the same outline in FIG. 4, there is no problem with the intermediate plate 303 having a larger outline than the upper cover 310 and the lower cover 311 since the function of these components is to separate the chambers from each other.

What is claimed is:

1. An image acquisition device comprising:
a housing;
a partition that divides an interior of the housing into first and second chambers;
a plurality of image acquisition elements disposed in the first chamber within the housing;
a driving section disposed in the second chamber within the housing;
a transmitting section that extends through the partition and transmits a driving force from the driving section;
a sealing section that is provided in a through-hole area for the transmitting section extending through the partition so as to seal a gap formed around the transmitting section; and
a light guiding section that is connected to the transmitting section in the first chamber and is configured to move into and out of an optical path of light from an object by the driving force transmitted by the transmitting section to guide light from the object to at least one of the plurality of image acquisition elements,
wherein one of the plurality of image acquisition elements is in the optical path of light.

2. The image acquisition device according to claim 1, wherein the multiple image acquisition elements have different characteristics from each other.

3. The image acquisition device according to claim 1, wherein the driving section includes a motor and a pinion fixed to a rotation shaft of the motor, and
wherein the transmitting section includes a rack that is meshed with the pinion and a connection member that connects the rack and the light guiding section to each other.

4. The image acquisition device according to claim 1, further comprising a closed container that is disposed so as to cover the periphery of the image acquisition element, wherein at least a portion of the closed container is formed of an optically transparent component.

5. The image acquisition device according to claim 1, wherein the light guiding section is a prism.

6. The image acquisition device according to claim 1, wherein the light guiding section is a mirror.

7. The image acquisition device according to claim 1, wherein the plurality of image acquisition elements are arranged in a direction parallel to a surface of the partition, and
wherein the transmitting section rotates the light guiding section about the through-hole area.

8. The image acquisition device according to claim 1, wherein the multiple image acquisition elements are arranged in a direction parallel to a surface of the partition, and
wherein the transmitting section moves the light guiding section in the direction parallel to the surface of the partition.

9. The image acquisition device according to claim 1, wherein the multiple image acquisition elements are arranged in a direction perpendicular to a surface of the partition, and
wherein the transmitting section moves the light guiding section in the direction perpendicular to the surface of the partition.

* * * * *